United States Patent
Liu et al.

(10) Patent No.: US 6,423,140 B1
(45) Date of Patent: Jul. 23, 2002

(54) DIE SET FOR PREPARING ABCABC MULTIPLE-STRIPE COATING

(75) Inventors: Ta-Jo Liu, Hsinchu; Yun-Wey Yu, Hsinchu Industrial District, both of (TW)

(73) Assignee: Formosa Advanced Coating Technologies, Inc., Hsinchu Industrial District (TW)

( * ) Notice: Subject to any disclaimer, the term of this patent is extended or adjusted under 35 U.S.C. 154(b) by 46 days.

(21) Appl. No.: 09/589,968

(22) Filed: Jun. 8, 2000

(51) Int. Cl.⁷ ............................. B05C 3/02; B05D 3/04; B29C 31/10; B29C 47/02; B29C 47/08

(52) U.S. Cl. ................... 118/411; 118/412; 427/286; 425/113; 425/133.5; 425/462

(58) Field of Search ................... 118/411, 412, 118/DIG. 4; 427/286, 420; 425/113, 133.5, 462

(56) References Cited

U.S. PATENT DOCUMENTS

| | | | |
|---|---|---|---|
| 4,106,437 A | | 8/1978 | Bartlett |
| 4,324,816 A | | 4/1982 | Landis |
| 5,614,260 A | | 3/1997 | Darcy |
| 5,700,325 A | * | 12/1997 | Watanabe ................... 118/411 |
| 6,159,544 A | * | 12/2000 | Liu et al. ................... 118/412 |

FOREIGN PATENT DOCUMENTS

| | | |
|---|---|---|
| JP | 7-136568 A | 5/1995 |
| JP | 7-195015 A | 8/1995 |
| JP | 8-038972 A | 2/1996 |
| JP | 8-099056 A | 4/1996 |

* cited by examiner

*Primary Examiner*—Laura Edwards
*Assistant Examiner*—Kevin P. Shortsle
(74) *Attorney, Agent, or Firm*—Jackson Walker L.L.P.

(57) ABSTRACT

The invention is related to the formation of three different and repeated stripes abbreviate as ABCABC-typed or A__B__C-typed at the die exit. The symbol, "__", implies that there is no coating between two adjacent stripes. In this invention a guide shim and a guide die are inserted between two coating dies. Three different coating solutions will flow into the die assembly through different inlet positions. Two of which are introduced from the two coating dies will flow through the multiple channels provided in the guide shim and the guide die respectively and then contact with each other and with the third solution introduced from a side of the guide die in the same slot section to form the ABCABC-typed stripes. The coating solutions can also flow through the multiple channels to the same slot section but not contact each other to form the A__B__C-typed stripes at the die exit with a modification of the die assembly.

5 Claims, 8 Drawing Sheets

DIE SET FOR PREPARING ABCABC MULTIPLE-STRIPE COATING

FIELD OF THE INVENTION

The present invention relates to an apparatus and a method for forming a coating layer, particularly to a die set and a method for forming a coating layer of multiple stripes composed of three materials A, B and C adjacent to one another in a repeated ABCABC or A_B_C_A_B_C pattern. The symbol, "_", implies that there is no coating between two adjacent stripes.

BACKGROUND OF THE INVENTION

The die coating technique has been developed since nineteen fifties. This technique was first applied to form a large-area continuous coating, and was modified to form various function coatings in electronic and information industries nowadays. Among them a stripe coating technique was used to form a coating layer of multiple stripes on a substrate, which involves die design and precision coating techniques. The stripe coating technique not only can be utilized to produce a conventional product such as an adhesive tape, but to fabricate advanced electronic devices such as laser printers, and Li batteries.

U.S. Pat. No. 4,106,437 discloses an apparatus for multiple stripe coating of a web with liquid coating composition which is comprised of a hopper having a pair of spaced lips and a pair of shims mounted in face-to-face arrangement within the hopper and positioned between the spaced lips. One of the shims is provided with a plurality of open-ended channels while the second shim is equipped with a plurality of projecting portions, corresponding in width and location to the desired stripes, which are in alignment with the open-ended channels and project beyond the open ends thereof. The apparatus is capable of carrying out multiple stripe coating of a web at high speeds and with a high degree of precision in regard to stripe width and registration.

U.S. Pat. No. 4,324,816 discloses extrudable materials which exhibit a decrease in viscosity as the shear rate is increased, such as magnetic dispersion striping materials, and are suitable for extrusion coating in the form of a narrow stripe. The stripe has predetermined uniform cross-sectional dimensions including substantially uniform thickness, and is coated onto a moving web by means of a die maintained in a predetermined spaced relation with the web. The die has two or more bores through which the extrudable material is extruded in columns onto the moving web to form the stripe thereon.

Japanese patent publication No. 7-136568 A discloses a method for simultaneously forming continuous coating surfaces of the same thickness free from joints in the transverse direction of a band-shaped material by segmenting a coating liquid passage consisting of manifold parts and a slit part in a transverse direction and supplying different kinds of coating liquids in the respective segmented passages.

Japanese patent publication No. 7-195015 A discloses methods for producing multiple stripe coating product. To easily control the coating width of a coating solution and to make accurate stripe coating possible, a liquid-permeable sheet is placed in a slot of a coating die to discharge a coating solution.

Japanese patent publication No. 8-038972 A discloses methods for producing multiple stripe coating product, in which continuously coating a stripe pattern consisting of plural colors on a belt-like material with one coating process and also easily changing the width of a stripe are made possible. A manifold is provided in the inside of a metallic material apart from a slot part for discharging a coating material. A plurality of through-holes communicated with the slot part, and a plurality of coating liquid feed-ports communicated with a coating liquid feed device at the outside of a die main body are formed on the manifold.

Japanese patent publication No. 8-099056 A discloses methods for forming a coating film in a stripe pattern with no fluctuation width and thickness by projecting a front block more than a back block toward a base material and forming jetting-out holes for a coating material in the flat face of the back block. In this prior art, a nozzle is composed of a front block positioned in the upper stream side in a base material running direction and a back block positioned in the down stream side. The front block of the nozzle is projected toward the base material side as compared with the back block. When a base material is moved along the surface of the nozzle composed in this way, the base material moves along the curved face of the front block and continuously moves above the back block of the nozzle in which jetting-out holes for a coating material are formed. Consequently, a coating film in a stripe pattern with no fluctuation of width is formed on the surface of the base material by coating.

When a coating product of multiple stripes is made, interfaces of different coating solutions will be affected by coating thickness thereof and physical properties of coating solutions, such as the viscosity and the surface tension. These will result in a tendency that the borders of the coating solutions extend outward and become thin, and thus a coating layer of inferior uniformity and low interfacial quality is formed.

In the aforesaid prior art methods for forming a coating in an ABAB pattern, it is difficult to ensure a definite and precise interface between two adjacent coating solutions A, B and even harder to generate an intermediate layer of multiple stripe in a multiple coating layer structure. Among them Japanese patent publication Nos. 7-136568, 8-038972 and 8-099056 have great disadvantages in non-uniform width of stripes and ambiguous interfaces of coating solutions A, B, because the two coating solutions are contacted with each other outside the die set. Moreover, none of the aforesaid prior art references discloses or suggests a technique for forming a coating layer of multiple stripes composed of three materials A, B and C adjacent to one another in a repeated ABCABC or A_B_C_A_B_C pattern.

The color filter used in the flat panel display system, such as STN-LCD and TN-LCD, was produced by optical exposure and development techniques, wherein R (red), G (green) and B (blue) stripes having a width of about 100 micrometer were fabricated one at a time. Accordingly, same tedious procedures have to be repeated trice. In the fabrication of a plasma display panel (PDP), R, G and B stripes having a thickness of 100 micrometers and a width of 50 micrometer were formed on a glass substrate by powder coating. In general, the powder coating was repeated about 10 times to meet the thickness requirement.

SUMMARY OF THE INVENTION

An object of the present invention is to provide a device and a method for simultaneously forming multiple stripes of repeated coating liquids composed of three materials A, B and C adjacent to one another in an alternating ABCABC pattern with distinct interfaces between adjacent strips of any two coating liquids.

Alternatively, multiple stripes of repeated coating liquids in an alternating A_B_C_A_B_C pattern is formed in the present invention.

In order to accomplish the object of the present invention a die set for preparing ABCABC or A_B_C_A_B_C repeated multiple-stripe coating composed of three different liquids A, B and C constructed according to the present invention comprises a B-liquid die, a B-liquid shim, a guide shim, an A-liquid shim, a guide die, a C-liquid shim and a C-die, wherein:

said guide die comprising a plurality of spaced C-liquid distribution blocks projecting from a first side thereof by the same height, a C-liquid blocking block projecting from a second side thereof opposite to said first side, a plurality of C-liquid distribution passages, each of said plurality of C-liquid distribution passages connecting said first side and said second side of said guide shim, an A-liquid groove on said first side of said guide shim, and an A-liquid inlet communicating with said A-liquid groove;

said guide shim comprising a plurality of spaced B-liquid distribution blocks projecting from a first side thereof by the same height, a B-liquid blocking block projecting from a second side thereof opposite to said first side of said guide shim, a plurality of B-liquid distribution passages, each of said plurality of B-liquid distribution passages connecting said first side and said second side of said guide shim;

said A-liquid shim is clamped between said first side of said guide die and said first side of said guide shim, wherein said A-liquid shim has a thickness equal to the height of said C-liquid distribution blocks and equal to the height of said B-liquid distribution blocks, wherein said C-liquid distribution blocks and said B-liquid distribution blocks are alternately adjacent to each other, so that a plurality of spaced B-C-liquid distribution blocks are formed, wherein said A-liquid shim has a shape enclosing said A-liquid groove and said B-C-liquid distribution blocks, so that an A-liquid fed to said A-liquid inlet will fill said A-liquid groove and flow around said B-C-liquid distribution blocks and in a slot formed between said first side of said guide die and said first side of said guide shim toward a direction away from said A-liquid groove to exit from said die set;

said B-liquid die comprising a B-liquid inlet and a B-liquid groove communicating with said B-liquid inlet;

said B-liquid shim is clamped between said second side of said guide shim and said B-liquid die, wherein said B-liquid shim has a thickness equal to a projecting height of said B-liquid blocking block, wherein said B-liquid shim has a shape enclosing said B-liquid groove and said B-liquid blocking block, and intimately joining to said B-liquid blocking block, so that a B-liquid fed to said B-liquid inlet will fill said B-liquid groove and flow into said plurality of B-liquid distribution passages to exit from said first side of said guide shim;

said C-liquid die comprising a C-liquid inlet and a C-liquid groove communicating with said C-liquid inlet; and said C-liquid shim is clamped between said second side of said guide die and said C-liquid die, wherein said C-liquid shim has a thickness equal to a projecting height of said C-liquid blocking block, wherein said C-liquid shim has a shape enclosing said C-liquid groove and said C-liquid blocking block, and intimately joining to said C-liquid blocking block, so that a C-liquid fed to said C-liquid inlet will fill said C-liquid groove and flow into said plurality of C-liquid distribution passages to exit from said first side of said guide die.

Preferably, each of said plurality of C-liquid distribution blocks of the die set of the present invention has an inverted-U shape and comprises a head and two legs, wherein said two legs point to a direction same as the direction of said A liquid exiting from said die set, wherein each of said plurality of C-liquid distribution passages has an outlet between said two legs of said C-liquid distribution block; each of said plurality of B-liquid distribution blocks has an inverted-U shape and comprises a head and two legs pointing to a direction same as the direction of said A liquid exiting from said die set, wherein each of said plurality of B-liquid distribution passages has an outlet between said two legs of said B-liquid distribution block.

Preferably, said two legs of said C-liquid distribution block have a length equal to that of said two legs of said B-liquid distribution block.

Preferably, the length of said two legs of said C-liquid distribution block and the length of said two legs of said B-liquid distribution block are not long enough to reach an edge of said die set, so that said A liquid, said B liquid and said C liquid will join at positions near ends of said two legs of each of said plurality of B-liquid distribution blocks and each of said plurality of C-liquid distribution blocks, and form an ABCABC pattern, when said A liquid, said B liquid and said C liquid are fed to said A-liquid inlet, said B-liquid inlet and said C-liquid inlet, respectively.

Alternatively, the length of said two legs of said C-liquid distribution block and the length of said two legs of said B-liquid distribution block are long enough to reach an edge of said die set, so that said A liquid, said B liquid and said C liquid will not join inside said die set, and will form an A_B_C_A_B_C pattern on a substrate passing underneath said edge of said die set, when said A liquid, said B liquid and said C liquid are fed to said A-liquid inlet, said B-liquid inlet and said C-liquid inlet, respectively.

The present invention also discloses a method for forming multiple stripes of repeated coating liquids composed of three materials A, B and C on a substrate by using the die set of the present invention, which comprises the following steps:

a) feeding said A liquid, said B liquid and said C liquid into said A-liquid inlet, said B-liquid inlet and said C-liquid inlet, respectively; and b) continuously passing a substrate under said slot formed between said first side of said guide block and said first side of said guide shim to allow said A liquid, said B liquid and said C liquid to adhere to said substrate forming an ABCABC pattern or A_B_C_A_B_C pattern.

The method of the present invention may further comprises changing said thickness of said A-liquid shim as well as the height of said C-liquid distribution blocks and the height of said B-liquid distribution blocks, or changing flow rates of said A liquid, said B liquid or said C liquid, to adjust thickness of said A liquid, said B liquid or said C liquid adhering to said substrate.

Preferably, said A liquid, B liquid and C liquid have red color, green color and blue color, respectively.

The present invention also provides a coated product having ABCABC repeated multiple-stripe coating, which comprises a flat substrate, and ABCABC repeated multiple-stripe coating composed of three different liquids A, B and C on a surface of said flat substrate, wherein said ABCABC repeated multiple-stripe coating is formed simultaneously and every two adjacent stripes thereof contact each other, wherein each stripe of said ABCABC repeated multiple-stripe coating has a width less than 200 micrometers.

Preferably, each stripe of said ABCABC repeated multiple-stripe coating has a width of 20 micrometers to 150 micrometers, and a thickness of 1 micrometer to 50 micrometers.

Preferably, said A stripe, B stripe and C stripe of said ABCABC repeated multiple-stripe coating have red color, green color and blue color, respectively.

Alternatively, the present invention provides a coated product having A_B_C_A_B_C repeated multiple-stripe coating, which comprises a flat substrate, and A_B_C_A_B_C repeated multiple-stripe coating composed of three different liquids A, B and C on a surface of said flat substrate, wherein said A_B_C_A_B_C repeated multiple-stripe coating is formed simultaneously, and every two adjacent stripes thereof do not contact each other, wherein each stripe of said A_B_C_A_B_C repeated multiple-stripe coating has a width less than 200 micrometers.

Preferably, each stripe of said A_B_C_A_B_C repeated multiple-stripe coating has a width of 20 micrometers to 150 micrometers, and a thickness of 1 micrometer to 50 micrometers.

Preferably, said A stripe, B stripe and C stripe of said A_B_C_A_B_C repeated multiple-stripe coating have red color, green color and blue color, respectively.

The present invention can be more fully understood by reference to the following detailed description and accompanying drawings.

DETAILED DESCRIPTION OF THE PREFERRED EMBODIMENTS

We invented a die set and a method for forming a coating layer composed of two materials A and B that are arranged in adjacent stripes in an ABAB alternating pattern in our previous work, for which a U.S. patent application was filed on Jun. 1, 1999 and accorded a Ser. No. of 09/323,315. The die set disclosed in this previous work is characterized in sandwiching a guide shim with two dies, creating two chambers therebetweem, so that liquid A and liquid B fed separately into the two die can join with the help from multiple distribution passages provided in the guide shim for communicating the two chambers. The details thereof are incorporated herein by reference.

Figure 1:
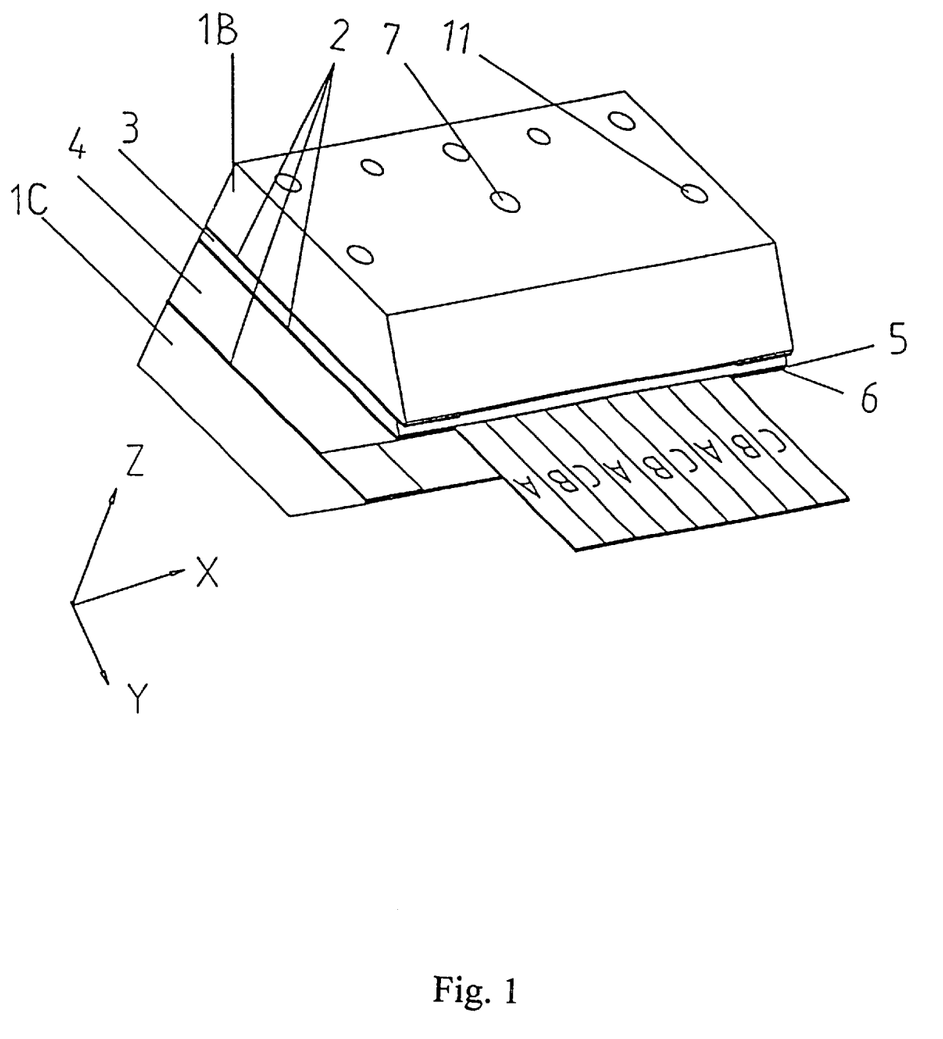
FIG. 1 is a perspective view of a die set according to one of the preferred embodiments of the present invention.
Figure 2:
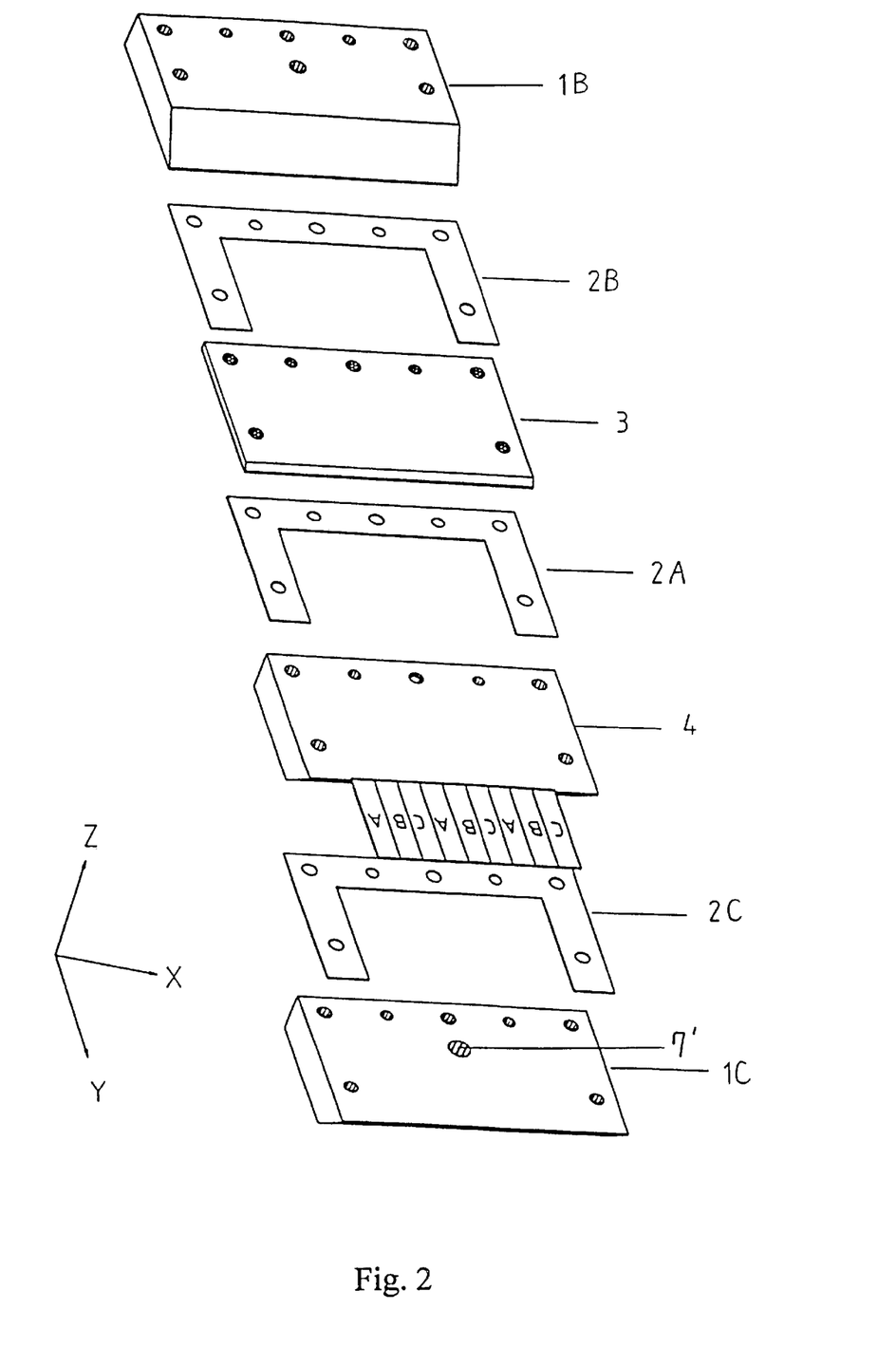
FIG. 2 is an exploded view of the die set of the present invention, wherein details thereof have been omitted.

In the present invention we further discloses a die set and a method for forming a coating layer composed of three materials A, B and C that are arranged in adjacent stripes in an ABCABC or A_B_C_A_B_C alternating pattern. A die set for forming a coating layer in an ABCABC alternating pattern constructed according to one of the preferred embodiments of the present invention is shown in FIGS. 1 and 2, which comprises an upper die 1B, a B-liquid shim 2B, a guide shim 3, an A-liquid shim 2A, a guide die 4, a C-liquid shim 2C and a lower die 1C, which are clamped together according to the aforesaid sequence. The elements of die set can be grouped into four portions: 1) the outer structure composed of two T-dies, the upper die 1B and the lower die 1C; 2) the shims 2 which can be used to adjust the thickness of the coating layer by varying their thickness; 3) the guide shim 3 for introducing B liquid fed to the upper die 1B to a flows-joining plane on the guide die 4 with the help from multiple distribution passages provided in the guide shim 3; and 4) the guide die 4 for providing the flow-joining plane on one side thereof, for distributing A liquid fed to the guide die 4 on the flows-joining plane, and for introducing C liquid fed to the lower die 1C to the flows-joining plane with the help from multiple distribution passages provided in the guide die 4.

Figure 3A:
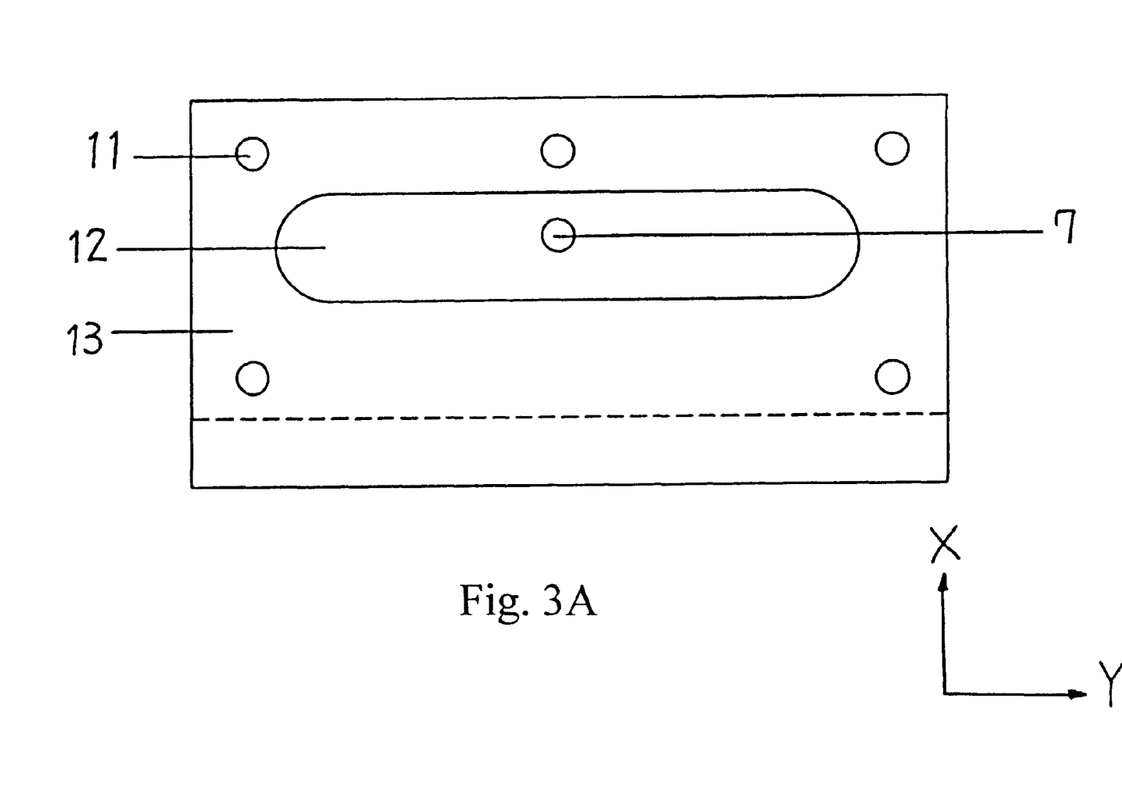
FIGS. 3A and 3B are a top view and a side view of the upper die 1B of the die set shown in FIG. 1, respectively.
Figure 3B:
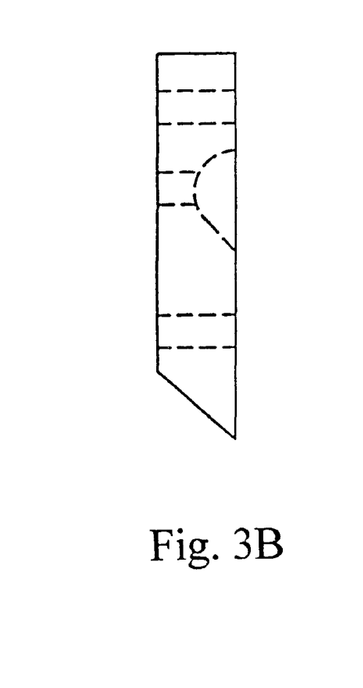
Figure 7:
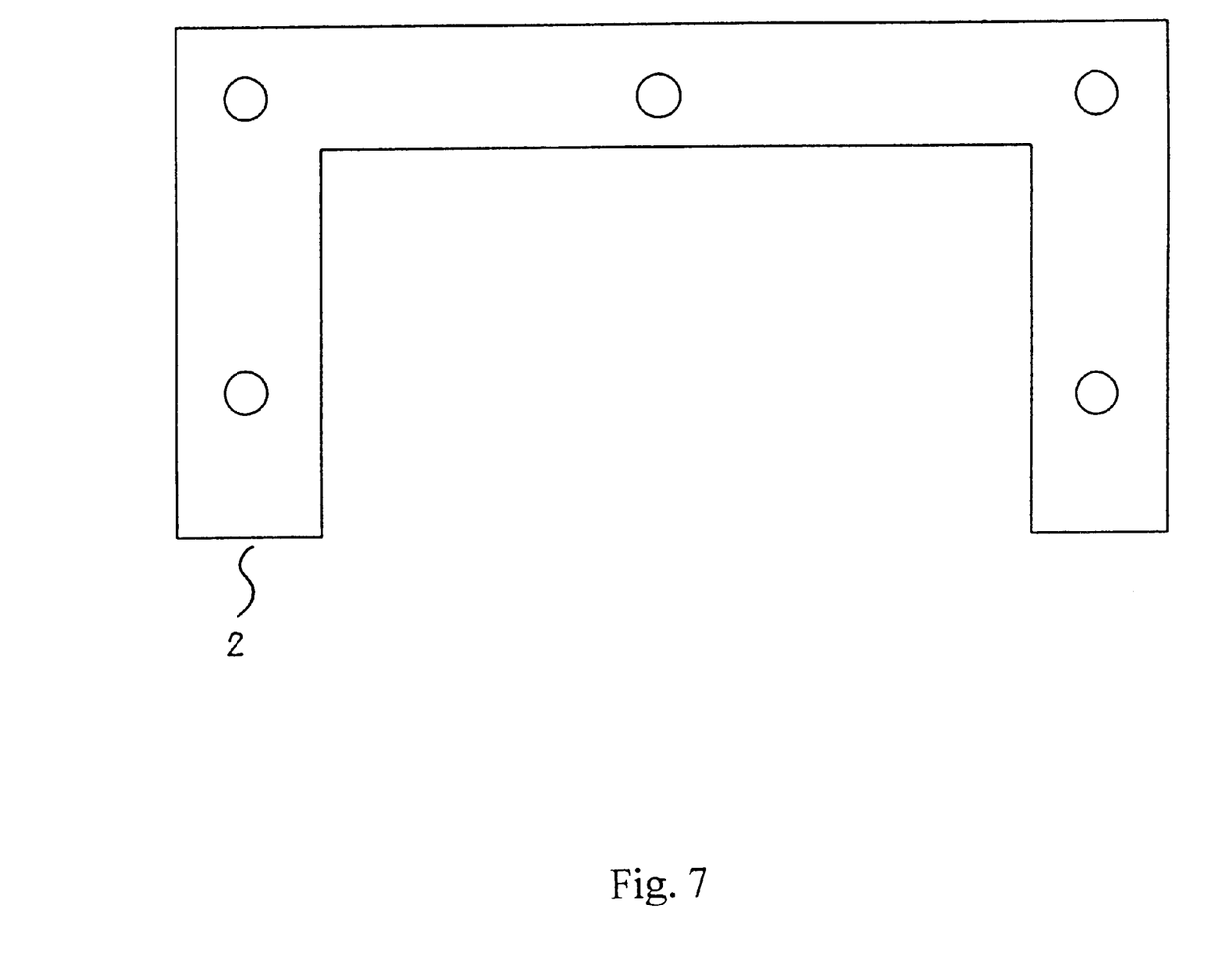
FIG. 7 is a plan view of the shims 2 shown in FIG. 1.

The upper die 1B and the lower die 1C are similar in construction and function to each other, and can be clamped together to form the conventional T-dies die set after a shim 2 shown in FIG. 7 being sandwiched therebetween. As shown in FIGS. 3A and 3B, the upper die 1B has a groove 12 on the lower side thereof, an inlet hole 7 near the center thereof, and a plurality of screw holes 11 penetrating the upper die 1B from the upper side to the lower side thereof for fastening, and a feeding passage 13 connecting the inlet hole 7 and the groove 12. The groove 12 functions as a distribution cavity, which allows the B liquid to spread in X-direction first and advance in Y-direction as a linear front.

Figure 4A:
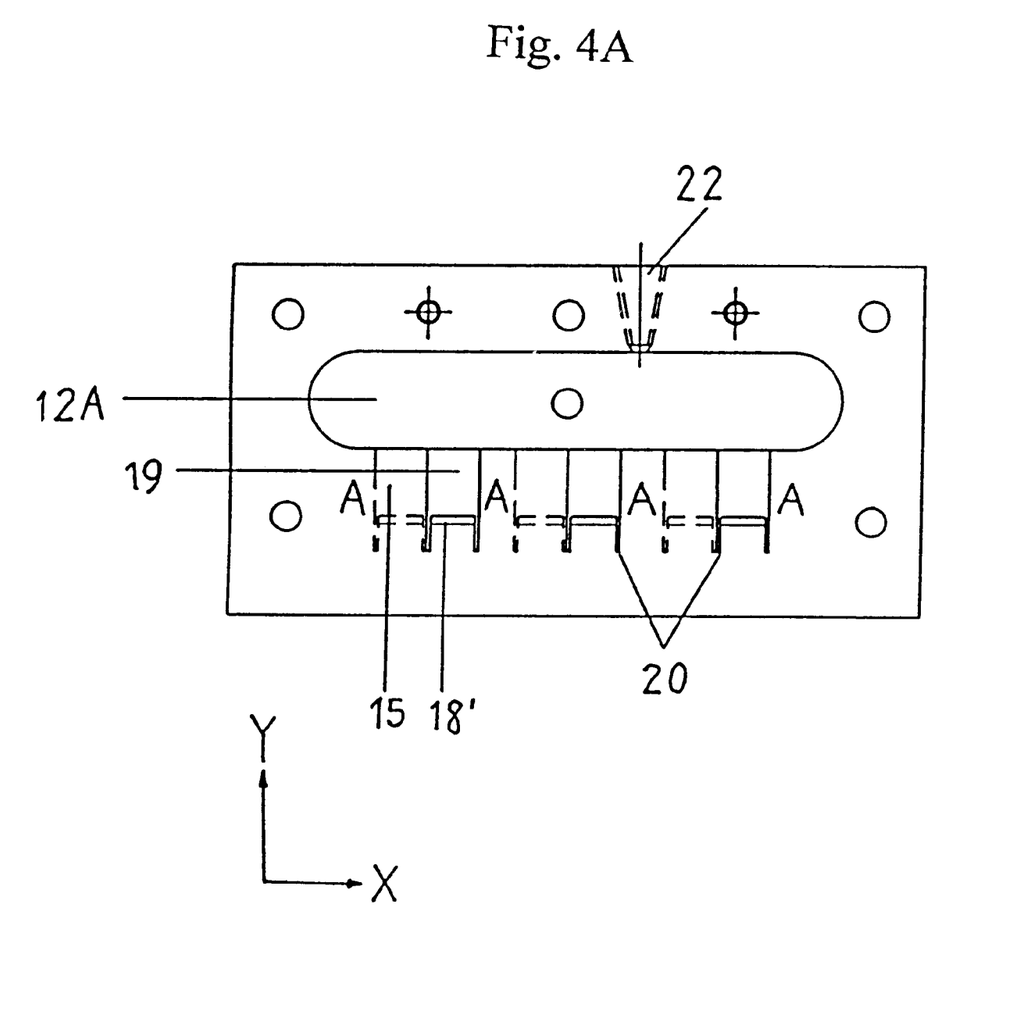
FIGS. 4A, 4B and 4C are a top view, a bottom view and a side view of the guide die 4 of the die set shown in FIG. 1, respectively.
Figure 4B:
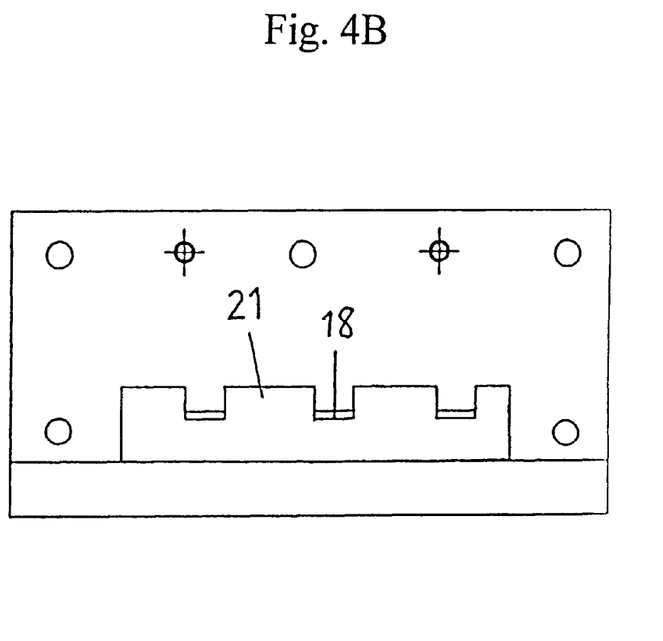
Figure 4C:
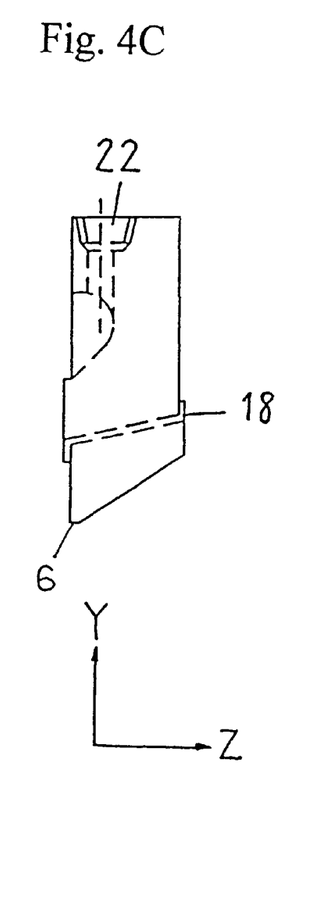

Referring to FIGS. 4A, 4B and 4C, said guide die 4 comprises three equidistantly spaced C-liquid distribution blocks 19 projecting from an upper side thereof (the flows-joining plane) by the same height, a C-liquid blocking block 21 projecting from a lower side thereof, three C-liquid distribution passages 18, each of said C-liquid distribution passages 18 connecting said upper side and said lower side, an A-liquid groove 12A on said upper side, and an A-liquid inlet 22 communicating with said A-liquid groove 12A. The guide die 4 further has an inclined die shoulder at one of its lateral sides. The die shoulder has a common edge with the upper side of the guide die 4, forming a die lip 6.

Figures 5A, 5C:
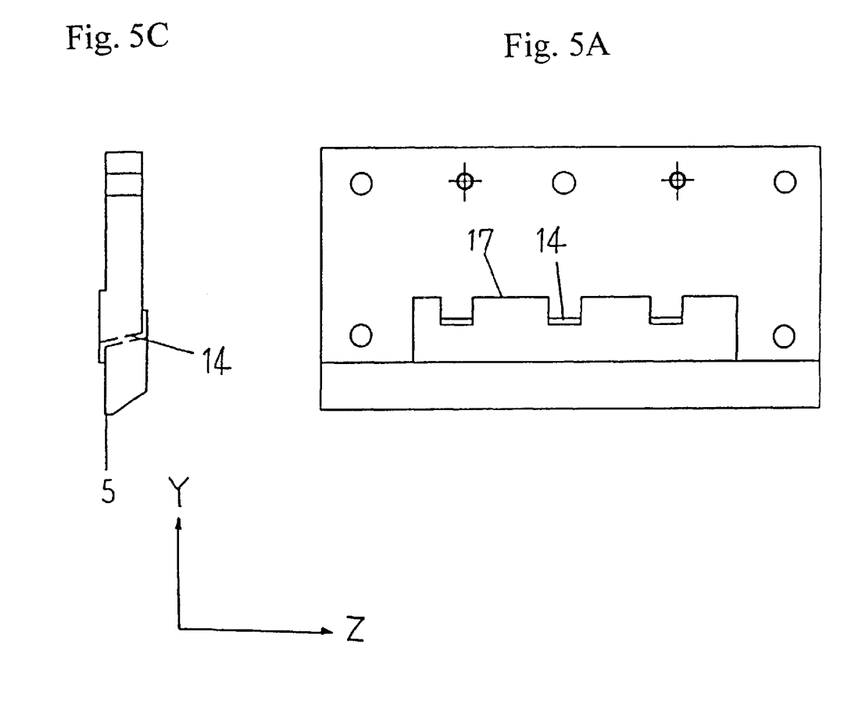
FIGS. 5A, 5B and 5C are a top view, a bottom view and a side view of the guide shim 3 of the die set shown in FIG. 1, respectively.
Figure 5B:
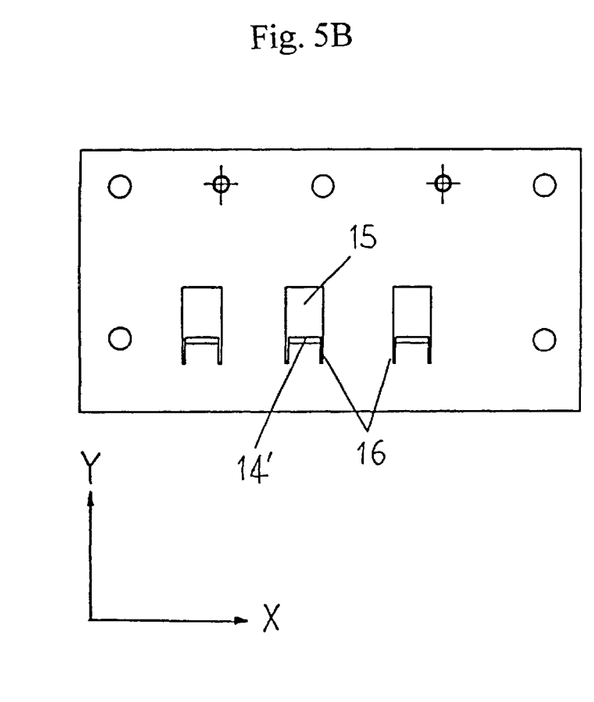

Further referring to FIGS. 5A, 5B and 5C, said guide shim 3 comprises three equidistantly spaced B-liquid distribution blocks 15 projecting from a lower side thereof by the same height, a B-liquid blocking block 17 projecting from an upper side thereof, three B-liquid distribution passages 14, each of said B-liquid distribution passages 14 connecting said upper side and said lower side of said guide shim 3. The guide shim 3 is also provided with a die lip 5 corresponding to said die lip 6 of said guide die 4.

As shown in FIGS. 1 and 2, said A-liquid shim 2A is clamped between said guide die 4 and said guide shim 3, wherein said A-liquid shim 2A has a thickness equal to the height of said C-liquid distribution blocks 19 and equal to the height of said B-liquid distribution blocks 15, wherein said C-liquid distribution blocks 19 and said B-liquid distribution blocks 15 are alternately adjacent to each other. As shown in FIG. 4A, three spaced B-C-liquid distribution blocks are formed by said C-liquid distribution blocks 19 and said B-liquid distribution blocks 15 (shown by dot lines). Said A-liquid shim 2A has a shape shown in FIG. 7, which encloses said A-liquid groove 12A and said B-C-liquid distribution blocks, so that the A-liquid fed to said A-liquid inlet 22 will fill said A-liquid groove 12A and flow around said B-C-liquid distribution blocks (as shown by the four alphabets "A" in FIG. 4A) toward a direction away from said A-liquid groove 12A to exit from said die set between the die lips 5 and 6.

The B-liquid shim 2B and C-liquid shim 2C have a shape identical to that of A-liquid shim 2A. Said B-liquid shim 2B is clamped between said upper side of said guide shim 3 and said lower side of said upper die 1B, as shown in FIGS. 1 and 2. Said B-liquid shim 2B has a thickness equal to a projecting height of said B-liquid blocking block 17; and has a shape enclosing said B-liquid groove 12 and said B-liquid blocking block 17, and intimately joining to said B-liquid blocking block 17, so that the B-liquid fed to said B-liquid inlet hole 7 will fill said B-liquid groove 12 and flow into said B-liquid distribution passages 14, and eventually will exit from said lower side of said guide shim 3. Similarly, the C liquid fed to a C liquid inlet hole 7' of the lower die 1C will enter the three C-liquid distribution passages 18 and exit from the upper side of said guide die 4.

Each of said C-liquid distribution blocks 19 has an inverted-U shape and comprises a head and two legs, wherein said two legs 20, as shown in FIG. 4A. Each of said C-liquid distribution passages 18 has an outlet 18' between said two legs 20. Similarly, each of said B-liquid distribution blocks 15 has an inverted-U shape and comprises a head and two legs 16, as shown in FIG. 5B. Each of said B-liquid distribution passages 14 has an outlet 14' between said two legs 16 of said B-liquid distribution block 15.

The length of said two legs 20 of said C-liquid distribution block 19 and the length of said two legs 16 of said B-liquid distribution block 15 are all equal, and car not reach an edge of said die set. When said A liquid, said B liquid and said C liquid are fed to said A-liquid inlet 22, said B-liquid inlet hole 7 and said C-liquid inlet 7', respectively; said A liquid will flow around said B-C-liquid distribution blocks as shown by the four alphabets "A" in FIG. 4A, said B liquid and said C liquid will exit from said outlets 14' and said outlet 18' as discussed in the preceding passage; they will join at positions near ends of said two legs 16 of each of said B-liquid distribution blocks 15 and said two legs 20 of each of said C-liquid distribution blocks 19; and thus form a coating layer of an ABCABC pattern in a slot between said upper side of said guide die 4 and said lower side of said guide shim 3, which will exit between the die lips 5 and 6 of the die set, as shown in FIG. 1.

Figure 6:
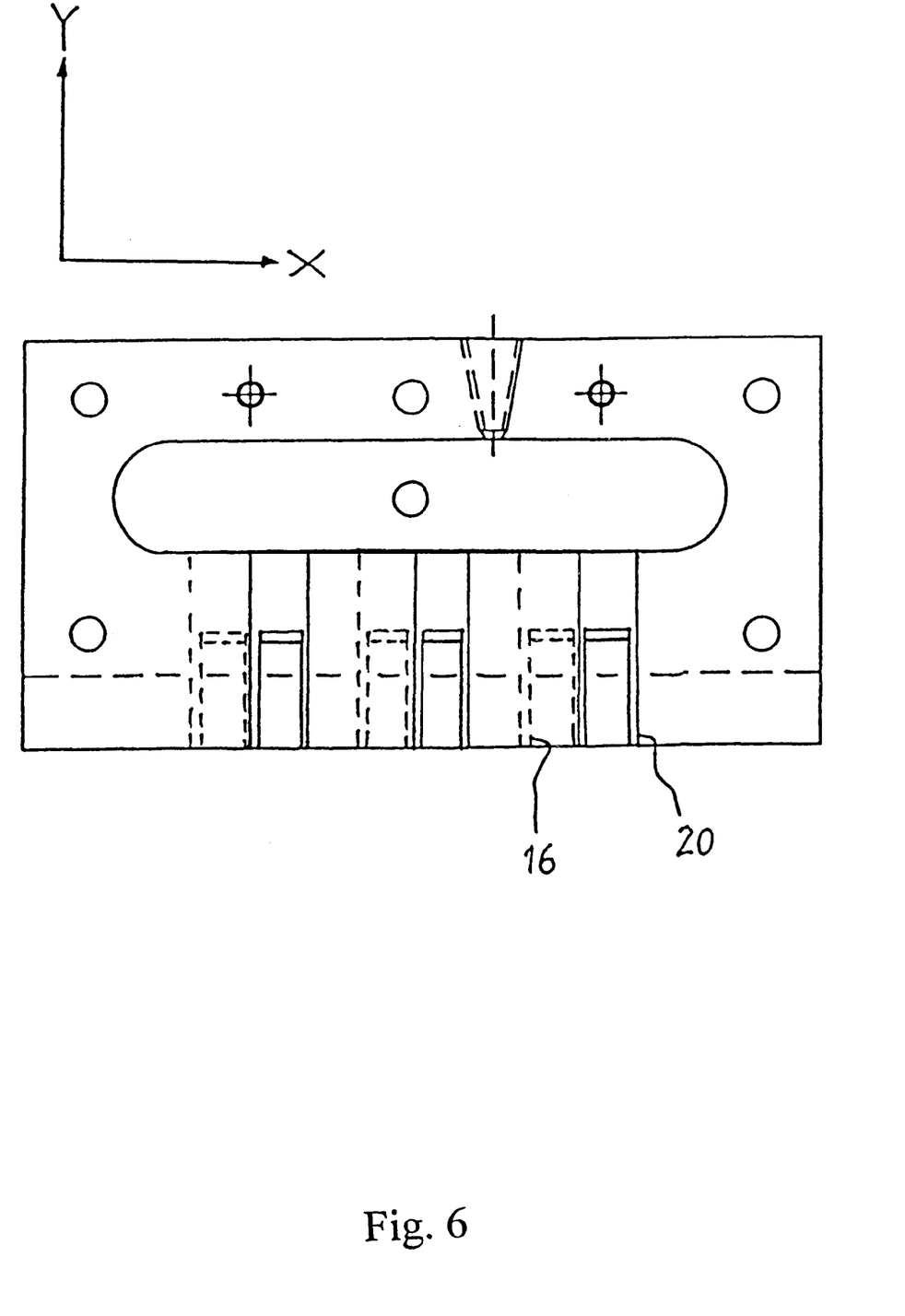
FIG. 6 shows a top view of a guide die modified to form a coating layer of A_B_C_A_B_C pattern according to another preferred embodiment of the present invention.

The preferred embodiment shown in FIGS. 1 to 5, and 7, can be modified to form a coating layer of an A_B_C_A_B_C pattern by extending the length of the two legs 16 of each B-liquid distribution block 15 and the length of the two legs 20 of each C-liquid distribution block 19 to an edge of said die set, as shown in FIG. 6. Accordingly, the A liquid, B liquid and C liquid will not join in the slot between said upper side of said guide die 4 and said lower side of said guide shim 3, and will exit between the die lips 5 and 6 of the die set in A_B_C_A_B_C pattern, when said A liquid, said B liquid and said C liquid are fed to said A-liquid inlet 22, said B-liquid inlet hole 7 and said C-liquid inlet 7', respectively.

It is apparently that a plurality of the die sets of the present invention can be arranged one-by-one or zigzag to produce a coating layer or coating layers having a greater coverage on a substrate.

EXAMPLE

The die set shown in FIG. 1 was used to form a coating layer of an ABCABC pattern on a substrate. The dimensions of the die set are listed hereinafter:

| | |
|---|---|
| coating width | 100 mm |
| slot gap thickness | 0.5 mm |
| slot length | 28 mm |
| diameter of cavity | 30 mm |
| cavity shape | semi-teardrop |
| die lip thickness | 1 mm |
| stripe width | 1 mm |

A modified die set as shown in FIG. 6 was used to form a coating layer of A_B_C_A_B_C pattern. The dimensions of this modified die set are the same as above except the stripe width was changed from 1 mm to 0.77 mm.

PVA aqueous solution having a viscosity of 636.2 cps was coated on a polyethylene terephthalate (PET) substrate on a coating line, wherein red, green and blue pigments were added separately to three separate portions of the PVA solution to form A liquid, B liquid C liquid. The flow rates at the inlet for liquids A, B and C were 18 $cm^3/s$, 24 $cm^3/s$ and 18 $cm^3/s$, respectively, in the ABCABC case. For the A_B_C_A_B_C case, te flow rates at the inlet for liquids A, B and C were 21 $cm^3/s$, 28 $cm^3/s$ and 21 $cm^3/s$, respectively.

The results of this example show that the coating stripes of the coating layer of ABCABC pattern are straightforward and have an identical width with stable interface between the ABC stripes; and the coating stripes of the coating layer of A_B_C_A_B_C pattern are straightforward and have an identical width.

The die set used in this example can be made by utilizing the conventional mold making art. However, a precision fabrication technique will be required to control the tolerance within a few micrometers, when the width of the coating stripes is reduced to a level of 20–150 micrometers.

What is claimed is:

1. A die set for preparing ABCABC or A_B_C_A_B_C repeated multiple-stripe coating composed of three different liquids A, B and C, said die set comprising a B-liquid die, a B-liquid shim, a guide shim, an A-liquid shim, a guide die, a C-liquid shim and a C-die, wherein:

said guide die comprising a plurality of spaced C-liquid distribution blocks projecting from a first side thereof by the same height, a C-liquid blocking block projecting from a second side thereof opposite to said first side, a plurality of C-liquid distribution passages, each of said plurality of C-liquid distribution passages connecting said first side and said second side of said guide die, an A-liquid groove on said first side of said guide die, and an A-liquid inlet communicating with said A-liquid groove;

said guide shim comprising a plurality of spaced B-liquid distribution blocks projecting from a first side thereof by the same height, a B-liquid blocking block projecting from a second side thereof opposite to said first side of said guide shim, a plurality of B-liquid distribution passages, each of said plurality of B-liquid distribution passages connecting said first side and said second side of said guide shim;

said A-liquid shim is clamped between said first side of said guide die and said first side of said guide shim, wherein said A-liquid shim has a thickness equal to the height of said C-liquid distribution blocks and equal to the height of said B-liquid distribution blocks, wherein said C-liquid distribution blocks and said B-liquid distribution blocks are alternately adjacent to each other, so that a plurality of spaced B-C-liquid distribution blocks are formed, wherein said A-liquid shim has a shape enclosing said A-liquid groove and said B-C-liquid distribution blocks, so that an A-liquid fed to said A-liquid inlet will fill said A-liquid groove and flow around said B-C-liquid distribution blocks and in a slot formed between said first side of said guide die and said first side of said guide shim toward a direction away from said A-liquid groove to exit from said die set;

said B-liquid die comprising a B-liquid inlet and a B-liquid groove communicating with said B-liquid inlet;

said B-liquid shim is clamped between said second side of said guide shim and said B-liquid die, wherein said B-liquid shim has a thickness equal to a projecting height of said B-liquid blocking block, wherein said B-liquid shim has a shape enclosing said B-liquid groove and said B-liquid blocking block, and intimately joining to said B-liquid blocking block, so that a B-liquid fed to said B-liquid inlet will fill said B-liquid groove and flow into said plurality of B-liquid distribution passages to exit from said first side of said guide shim;

said C-liquid die comprising a C-liquid inlet and a C-liquid groove communicating with said C-liquid inlet; and said C-liquid shim is clamped between said second side of said guide die and said C-liquid die, wherein said C-liquid shim has a thickness equal to a projecting height of said C-liquid blocking block, wherein said C-liquid shim has a shape enclosing said C-liquid groove and said C-liquid blocking block, and intimately joining to said C-liquid blocking block, so that a C-liquid fed to said C-liquid inlet will fill said C-liquid groove and flow into said plurality of C-liquid distribution passages to exit from said first side of said guide die.

2. The die set according to claim 1, wherein each of said plurality of C-liquid distribution blocks has an inverted-U shape and comprises a head and two legs, wherein said two legs point to a direction same as the direction of said A liquid exiting from said die set, wherein each of said plurality of C-liquid distribution passages has an outlet between said two legs of said C-liquid distribution block; each of said plurality of B-liquid distribution blocks has an inverted-U shape and comprises a head and two legs pointing to a direction same as the direction of said A liquid exiting from said die set, wherein each of said plurality of B-liquid distribution passages has an outlet between said two legs of said B-liquid distribution block.

3. The die set according to claim 2, wherein said two legs of said C-liquid distribution block have a length equal to that of said two legs of said B-liquid distribution block.

4. The die set according to claim 3, wherein the length of said two legs of said C-liquid distribution block is not long enough to reach an edge of said die set, so that said A liquid, said B liquid and said C liquid will join at positions near ends of said two legs of each of said plurality of B-liquid distribution blocks and each of said plurality of C-liquid distribution blocks, and form an ABCABC pattern, when said A liquid, said B liquid and said C liquid are fed to said A-liquid inlet, said B-liquid inlet and said C-liquid inlet, respectively.

5. The die set according to claim 3, wherein the length of said two legs of said C-liquid distribution block is long enough to reach an edge of said die set, so that said A liquid, said B liquid and said C liquid will not join inside said die set, and will form an A_B_C_A_B_C pattern on a substrate passing underneath said edge of said die set, when said A liquid, said B liquid and said C liquid are fed to said A-liquid inlet, said B-liquid inlet and said C-liquid inlet, respectively.

* * * * *